(12) United States Patent
Hofmann (10) Patent No.: US 7,261,935 B2
(45) Date of Patent: Aug. 28, 2007

(54) CO-EXTRUDABLE MULTI-LAYER POLYMER

(75) Inventor: George Henry Hofmann, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 350 days.

(21) Appl. No.: 10/683,827

(22) Filed: Oct. 10, 2003

(65) Prior Publication Data

US 2004/0121172 A1 Jun. 24, 2004

Related U.S. Application Data

(60) Provisional application No. 60/434,542, filed on Dec. 19, 2002.

(51) Int. Cl.
| | |
|---|---|
| B32B 7/04 | (2006.01) |
| B32B 27/08 | (2006.01) |
| B32B 27/32 | (2006.01) |
| B32B 27/34 | (2006.01) |
| B32B 27/36 | (2006.01) |

(52) U.S. Cl. .................. 428/212; 428/343; 428/355 R; 428/355 EN; 428/355 AC; 428/412; 428/474.7; 428/475.2; 428/476.3; 428/480; 428/483; 428/515; 428/516; 428/518; 428/520; 428/522; 428/523

(58) Field of Classification Search ............ None
See application file for complete search history.

(56) References Cited

U.S. PATENT DOCUMENTS

| 4,262,051 | A | * | 4/1981 | Welz et al. ............. 442/396 |
| 4,472,555 | A | * | 9/1984 | Schmukler et al. ......... 525/74 |
| 4,477,532 | A | * | 10/1984 | Schmukler et al. ......... 428/441 |
| 4,636,442 | A | * | 1/1987 | Beavers et al. ............. 428/480 |
| 4,665,153 | A | * | 5/1987 | Beavers et al. ............. 528/173 |
| 4,753,980 | A | * | 6/1988 | Deyrup ..................... 524/369 |
| 4,957,968 | A | * | 9/1990 | Adur et al. .................. 525/74 |
| 5,053,457 | A | * | 10/1991 | Lee ............................ 525/78 |

(Continued)

FOREIGN PATENT DOCUMENTS

| DE | 40 10 648 A1 | 10/1991 |
| DE | 296 15 956 U1 | 11/1996 |
| GB | 2 270 496 A | 3/1994 |
| WO | WO96/18500 | 6/1996 |

OTHER PUBLICATIONS

P. Maury, Gluing Plastics: The Art of Making Your Choice, Caoutchoucs & Plasiques, 757 (1997).

(Continued)

Primary Examiner—Vivian Chen (57) ABSTRACT

The present invention provides a multi-layer polymer composition having a polar outer layer and a non-polar second outer layer. The polar outer layer is preferably PVC and the non-polar outer layer, polypropylene. The adhesive tie layer is a unique blend of a copolyester elastomer, a non-polar polymer, and a copolymer that contains functional groups capable of reaction with the functional end groups of the copolyester elastomer and that is totally or partially miscible with the non-polar polymer in the second outer layer. The multi-layer polymer can be advantageously coextruded. The non-polar outer layer can comprise the bulk of a fabricated part, with only a thin layer of polar polymer, providing desired attributes of the polar polymer at a lower cost.

25 Claims, 1 Drawing Sheet

U.S. PATENT DOCUMENTS

| | | | |
|---|---|---|---|
| 5,089,332 A * | 2/1992 | Feinberg | 428/328 |
| 5,160,788 A * | 11/1992 | Feinberg | 428/344 |
| 5,300,563 A * | 4/1994 | Kiang et al. | 525/42 |
| 5,618,881 A * | 4/1997 | Hojabr | 525/64 |
| 5,889,114 A * | 3/1999 | Statz | 525/166 |
| 6,045,732 A * | 4/2000 | Nakatsuji et al. | 264/46.4 |
| 6,136,732 A | 10/2000 | Patel | |
| 6,180,719 B1 * | 1/2001 | Miyata | 525/108 |
| 6,773,735 B1 * | 8/2004 | Dalgewicz, III | 426/127 |

OTHER PUBLICATIONS

Alphonsus V. Pocius, et al., The Use of Adhesives in the Joining of Plastics, Treatise on Adhesion and Adhesives, 1991, 333-435, vol. 7.

PCT International Search Report, International application No. PCT/US 03/40241, dated Apr. 14, 2004.

* cited by examiner

CO-EXTRUDABLE MULTI-LAYER POLYMER

This application claims the benefit of U.S. Provisional Application No. 60/434,542, filed Dec. 19, 2002, which is incorporated by reference herein for all purposes as if fully set forth.

BACKGROUND OF THE INVENTION

1. Field of the Invention

This invention relates to multi-layer polymer compositions that comprise two outer layers and an adhesive tie layer. This invention specifically relates to a multi-layer polymer composition comprising a polar polymer, e.g. polyvinylchloride (PVC), as the first outer layer, a non-polar polymer, e.g., polypropylene, as the second outer layer, and a unique blend of polymers for the adhesive tie layers that allows the composition to be easily and advantageously coextruded.

2. Description of Related Art

It is often desirable to adhere polar polymers to non-polar polymers. Non-polar polyolefins, such as polyethylene and polypropylene, have traditionally been available at a lower cost than polar polymers. Using the non-polar polymer for the bulk of a fabricated part, with only a thin layer of polar polymer on the surface, can provide attributes of the polar polymer at an overall lower cost.

As a specific example, PVC siding used in the housing construction industry typically has poor dimensional stability. Because of its low glass transition temperature, Tg, and flexibility, it can expand and contract with swings in atmospheric temperature, which can be a problem when used as housing siding. To minimize this problem, only heat-reflecting, light colors can be used.

To overcome the problem of poor dimensional stability, the PVC can be combined with a thick substrate of polypropylene, and/or glass fiber-reinforced or filled polypropylene, which are stiffer at all temperatures and more dimensionally stable. This can reduce cost, also, since the more expensive PVC can be a much thinner layer than that used in conventional siding. With the dimensional stability problem solved, darker color PVC's can also be used.

The problem remains, however, of adhering the polar polymer, e.g., PVC, to the non-polar polymer, e.g., polypropylene, in a structurally sound and cost-efficient manner.

Attempts have been made to solve this problem in the past. For example, U.S. Pat. No. 6,045,732 (Nakatsuji et al.), discloses a multi-layer molded article having a skin material layer of a vinyl chloride resin and a propylene resin core. They disclose an adhesive layer (A), used to combine the vinyl chloride resin and propylene resin core, containing two layers, one layer (polyester resin and epoxy-group containing ethylene copolymer) bonded to the vinyl chloride resin, one layer (at least one copolymer selected from an ethylene copolymer and epoxy group-containing copolymer) bonded to the propylene resin core. Alternatively, adhesive layer (B), comprising an ethylene resin composition containing a polybasic carboxylic acid and an epoxy group-containing copolymer, can be used. These multi-layer articles, however, must be formed by molding under heat and pressure to form the final multi-layer article. The adhesive layers are formed in advance in a separate step by, for adhesive layer (A), co-extruding the adhesive layer, or by powder molding, inflation molding or extrusion, for adhesive layer (B).

BRIEF SUMMARY OF THE INVENTION

The invention herein provides a multi-layer polymer comprising
(1) a first outer layer,
(2) a second outer layer and
(3) an adhesive tie layer between the two outer layers,
wherein the first outer layer comprises a polar polymer, the second outer layer comprises a non-polar polymer, and the adhesive tie layer comprises
(a) a copolyester elastomer that is totally or partially miscible with the polar polymer, (b) a non-polar polymer that is totally or partially miscible with the non-polar polymer in the second outer layer and (c) a copolymer that contains functional groups capable of reaction with the functional end groups of component (a) and that is totally or partially miscible with the non-polar polymer in the second outer layer.

Component (c) of the adhesive tie layer preferably comprises an ethylene copolymer of the formula E/X/Y, wherein
E is the radical formed from ethylene and comprises about 40–90 weight % of the ethylene copolymer
X is the radical formed from wherein R1 is an alkyl group with 1–8 carbon atoms,
R2 is selected from the group consisting of H, $CH_3$, or $C_2H_5$, and X comprises about 0–40 weight percent of the ethylene copolymer and
Y is selected from the group consisting of glycidyl methacrylate and glycidyl acrylate, and Y comprises 0.1–20 weight percent of the ethylene copolymer.

The multi-layer polymers can be advantageously used as exterior siding for buildings as well as other articles. Furthermore, the invention provides processes for making a multi-layer polymer by coextrusion or by lamination.

DETAILED DESCRIPTION OF THE INVENTION

Definitions

The term "copolymer" means a polymer polymerized from two or more monomers, and thereby includes terpolymers, or more precisely, a polymer containing two or more repeat units.

The term "homopolymer" means a polymer polymerized from a single monomer in addition polymerizations, or from two monomers (e.g., one type of glycol and one type of diacid (or methyl ester of diacid)) in condensation polymerizations, or more precisely, a polymer containing one repeat unit.

The term "totally or partially miscible" can be explained as follows. The term "miscible" can be used to describe polymer-polymer blends with behavior similar to that expected of a single-phase system. In most instances the critical property will be the glass transition temperature; a blend with a single glass transition temperature can be classified as "totally miscible". With miscible polymer mixtures, mechanical compatibility is assured and a property compromise between the constituents is therefore achieved. The vast majority of polymer pairs, however, form two-phase blends after mixing, often evident from the small entropy of mixing for such very large molecules. These blends are generally characterized by opacity, distinct thermal transitions and poor mechanical properties. Usually, at least some mixing is observed at the polymer-polymer interface, resulting in a broadening of the two glass transitions, and these blends can therefore be considered "partially miscible."

Description

The present invention relates to a multi-layer polymer that is advantageously and easily formed by coextrusion. The invention overcomes the common problem of adhering a polar polymer to a non-polar polymer, and does so in a cost-effective and useful manner. The multi-layer polymer exhibits desired physical properties of the typically more expensive polar polymer, at a much lower cost than if the polar polymer was used alone. The resulting multi-layer polymer is useful in many ways, e.g., exterior siding for buildings, various construction materials, automobile interior parts, boat hulls and other marine parts, toys, etc.

The first embodiment of the invention provides a multi-layer polymer comprising (1) a first outer layer, (2) a second outer layer and (3) and adhesive tie layer between the two outer layers. The first outer layer comprises a polar polymer. The polar polymer is preferably selected from polyvinylchloride (PVC) homopolymer and copolymers, acrylonitrile-butadiene-styrene (ABS), polyvinylidene dichloride (PVDC), poly(ethylene terephthalate) (PET) homopolymer or copolymers, polyamides, polycarbonates, ethylene vinyl alcohol (EVOH) homopolymer and copolymers, acid copolymers, ionomers, liquid crystalline polymers, polyacetals, acetal copolymers and polylactic acid. PVC is most preferred as the polar polymer. The first outer layer is typically useful in a thickness range of about 2–10 mils (0.05–0.25 mm).

The second outer layer comprises a non-polar polymer. The non-polar polymer is preferably a polyolefin, and is more preferably selected from polypropylene homopolymer and copolymers, and polyethylene homopolymer and copolymers. The non-polar polymer is most preferably polypropylene homopolymer with or without fiberglass or other mineral (e.g., talc) reinforcement.

The adhesive tie layer comprises (a) a copolyester elastomer that is totally or partially miscible (see definition above) with the polar polymer, (b) a non-polar polymer that is totally or partially miscible with the non-polar polymer in the second outer layer, and (c) a copolymer that contains functional groups capable of reaction with the functional end groups of component (a), and that is totally or partially miscible with the non-polar polymer in the second outer layer.

The copolyester elastomer preferred in the invention herein is available from E. I. du Pont de Nemours and Company (Wilmington, Del.) under the trade name Hytrel® and is sold in various grades. Hytrel® is a thermoplastic ether-ester elastomer with properties of rubber and the mechanical performance of plastics. The polyether segments of the elastomer are relatively soft, and the polyester segments are relatively hard. The amounts of each can be varied to achieve different properties. The polar nature of the copolyester elastomer allows for the property of partial miscibility with the polar polymer in the first outer layer.

More specifically, the copolyester elastomer comprises a segmented thermoplastic copolyester comprising a multiplicity of recurring long chain ester units and short chain ester units joined head-to-tail through ester linkages. The long-chain ester units are represented by the formula and the short-chain units are represented by the formula where G is a divalent radical remaining after the removal of terminal hydroxy groups from a poly(alkylene oxide) glycol having a molecular weight of about 400–6,000 and a carbon to oxygen ratio of about 2.0–4.3. R is a divalent radical remaining after removal of carboxyl groups from a dicarboxylic acid having a molecular weight less than about 300. D is a divalent radical remaining after removal of hydroxyl groups from a diol having a molecular weight less than about 250. The short-chain ester units amount to about 15–95 percent by weight of the copolyester, and at least about 50 percent of said short-chain ester units are identical. The copolyester elastomer is further described in U.S. Pat. Nos. 4,739,012, 3,651,014, 3,763,109, and 3,755,146, incorporated by reference herein.

Although not essential components of the copolyester elastomer, various amounts of any number of conventional fillers or compounding ingredients may be admixed. Examples of such ingredients include various carbon blacks, clays, silica, alumina, calcium carbonate, titanium dioxide, glass fibers, antioxidants, antidegradants, tackifiers, processing aids such as lubricants and waxes, and plasticizers such as dialkylphthalates, trialkylmellitates, dialkyl esters such as dialkyl adipates, azeleates and glutarates, and polyester oligomers. The amounts used depend, at least in part, upon the quantities of other ingredients in the composition and the properties desired from the composition. Also, minor amounts of other saturated and unsaturated polymers, such as alpha-olefins, may be added to reduce the cost or modify the properties of the composition.

Hytrel® 4069 and 4056 are high performance grades of thermoplastic ether-ester elastomer preferred in the invention herein for the copolyester elastomer. They comprise soft segments of polytetramethylene glycol (PTMEG) and generally exhibit a shore D hardness of about 55 or less.

Component (b) of the adhesive tie layer is a non-polar polymer that is totally or partially miscible with the non-polar polymer in the second outer layer. Component (b) is preferably a polyolefin, and more preferably polypropylene homopolymer or copolymer, or polyethylene homopolymer or copolymer. Most preferably, component (b) is the same non-polar polymer that comprises the second outer layer.

Component (c) of the adhesive tie layer comprises a copolymer that contains functional groups capable of reaction with the functional end groups of component (a) (i.e., hydroxyl and acid end groups) and that is partially or totally miscible with the non-polar polymer in the second outer layer. Preferred functional groups capable of reaction with the functional end groups of component (a) include epoxy and anhydride functional groups. The preferred amount of epoxy functionality or anhydride functional groups is determined by trial and error by one skilled in the art. Too much functionality could cause the copolyester elastomer to crosslink and make it difficult for the copolyester elastomer to flow through an extruder. Too little functionality and the copolyester elastomer will not react completely enough, leaving two phases without enough covalent bonding for proper strength.

Component (c) preferably comprises an ethylene copolymer of the formula E/X/Y, wherein E is the radical formed from ethylene, X is the radical formed from wherein R1 is an alkyl group with 1–8 carbon atoms, R2 is selected from the group consisting of H, CH$_3$, or C$_2$H$_5$, or, alternatively, X is vinyl acetate, and Y is selected from the group consisting of glycidyl methacrylate and glycidyl acrylate. E preferably comprises about 40–90 weight %, X preferably comprises about 0–40 weight %, and Y preferably comprises about 0.1–20 weight %, wherein all weight percentages are based on the total weight of the ethylene copolymer. More preferably, the E/X/Y copolymer is selected from the group consisting of copolymers of: ethylene-n-butyl acrylate-glycidyl methacrylate (EnBAGMA), ethylene-butyl acrylate-glycidyl methacrylate (EBAGMA), ethylene-glycidyl methacrylate (EGMA), ethylene-methyl acrylate-glycidyl methacrylate (EMAGMA), ethylene-ethyl acrylate-glycidyl methacrylate (EEAGMA), ethylene-propyl acrylate-glycidyl methacrylate (EPAGMA), and ethylene-vinyl acetate-glycidyl methacrylate (EVAGMA). Most preferably the E/X/Y copolymer is EnBAGMA.

Component (c) may also preferably comprise an acid copolymer or anhydride derived from an acid copolymer. In that embodiment, component (c) more preferably comprises maleic-anhydride-grafted polypropylene.

As for the overall composition of the adhesive tie layer, preferably component (a) comprises about 25–65% by weight, component (b) comprises about 0–65% by weight, and component (c) comprises about 10–50% by weight, wherein all weight percentages are based on the total weight of the adhesive tie layer. More preferably, component (b) comprises about 25–65% by weight.

In a preferred embodiment of the multi-layer polymer of the invention herein, the first outer layer comprises PVC, the second outer layer comprises polypropylene homopolymer, and the adhesive tie layer comprises about 25–65% by weight Hytrel® 4069, more preferably about 30–46% by weight, most preferably about 38% by weight; about 0–65% by weight polypropylene homopolymer, more preferably about 10–50% by weight and most preferably about 35–55% by weight; and about 10–50% by weight EnBAGMA, more preferably about 25–65% by weight, and most preferably about 15–20% by weight, wherein the weight percentages are based on the total weight of the adhesive tie layer.

Generally speaking, any of the polymers comprising the multi-layer polymer of the invention herein may additionally contain any number of conventional additives, including fillers, compounding ingredients, antioxidants, anti-degradants, tackifiers, processing aids such as lubricants, waxes, plasticizers, and others as would be known to one of skill in the art.

Alternatively, in another embodiment of the multi-layer polymer herein, the adhesive tie layer may comprise a two-layer structure, that could be formed by coextrusion or molding prior to joining the first and second outer layers. In this embodiment, just components (c) and (a), as described above, would be used in the adhesive tie layer, each as its own sub-layer. For example, EnBAGMA could be used as component (c) and form one sub-layer, and a copolyester, e.g., a segmented thermoplastic ether-ester, could be used as component (a) and form another sub-layer of the two-layer adhesive tie layer. The adhesive tie layer could then be laminated or coextruded to the first and second outer layers, the EnBAGMA layer contacting the second outer layer and the copolyester contacting the first outer layer.

The invention herein further provides a process for making a multi-layer polymer comprising the step of coextruding the first outer layer, the second outer layer and the adhesive tie layer, as described above. One advantage of the invention herein is that the multi-layer polymer can be easily formed by coextrusion, and avoids multiple-step processing as is the case with most similar multi-layer polymers described in the art. The coextrusion can be accomplished using an insert in the extruder die such as that shown in FIGS. 1A and 1B, which allows three polymer streams, of varying thickness, to be extruded into one three-layer structure. The polymer streams will enter through the top of the die insert 40 and exit through the bottom 50. The die insert has three openings, the first 10 is an opening that can be used for an incoming stream of a first outer layer, the second opening 20 will funnel the incoming stream of the second outer layer, and the third opening 30 will direct the incoming stream of the adhesive tie layer. All three streams will exit the die as one multi-layer polymer. The processing conditions would be known to those skilled in the art.

Additionally, if desired, the multi-layer polymer of the invention herein may also be formed by a process of lamination. In that case, each of the first and second outer layers, and the adhesive tie layer would be individually extruded. The three extruded layers would then be subjected to sufficient heat and pressure to fuse the layers and form a multi-layer polymer. The required heat and pressure would be known to those skilled in the art.

The invention will be further clarified by the following examples, which are intended to be purely exemplary only.

EXAMPLES

Coextrudable Adhesive Formulations

Tables 1 through 7 describe the range of formulations tested, in which a polar resin was adhered to a non-polar, polyolefin substrate.

TABLE 1

COEXTRUDABLE ADHESIVE BLENDS
W&P TWIN SCREW (30 mm) SCALE-UP RUNS

| INGREDIENT (PTS) | 1A | 1B | 1C |
|---|---|---|---|
| HYTREL ® 4069 (1) | 60 | 60 | 60 |
| PP (2) | 30 | 30 | 30 |
| EBAGMA (3) | 10 | 20 | 30 |
| MISC. | | | |

TABLE 1-continued

COEXTRUDABLE ADHESIVE BLENDS
W&P TWIN SCREW (30 mm) SCALE-UP RUNS

| INGREDIENT (PTS) | 1A | 1B | 1C |
|---|---|---|---|
| PROPERTIES | | | |
| TENSILE STR.YLD.(PSI) | 1261 | 1088 | 1043 |
| (MPa) | 8.7 | 7.5 | 7.2 |
| ELONG.YLD. (%) | 10 | 11 | 11 |
| TENSILE STR.BK.(PSI) | 1043 | 1107 | 1121 |
| (MPa) | 7.2 | 7.6 | 7.7 |
| ELONG.BK. (%) | 57 | 61 | 55 |
| MELT IND. (4) | 0.2 | 0.4 | 0.4 |
| MELT IND. (5) | 66 | 108 | 112 |

(1) MI = 0 @ 2.16 KG; 17 @ 21.6 KG (200° C.)
(2) PROFAX ® 6823 (MI = 0.2)
(3) EP 4934-6 (MI = 15)
(4) 200° C., 2160 GR
(5) 200° C., 21.6 KG.

TABLE 2

COEXTRUDABLE ADHESIVE BLENDS
W&P TWIN SCREW (30 mm) SCALE-UP RUNS

| INGREDIENT (PTS) | 2A | 2B | 2C |
|---|---|---|---|
| HYTREL ® 4069 (1) | 60 | 60 | 60 |
| PP (2) | 30 | 30 | 30 |
| EGMA (3) | 10 | 20 | 30 |
| MISC. | | | |
| PROPERTIES | | | |
| TENSILE STR.YLD.(PSI) | 1053 | 1677 | 1475 |
| (MPa) | 7.3 | 11.6 | 10.2 |
| ELONG.YLD. (%) | 7 | 7 | 7 |
| TENSILE STR.BK.(PSI) | 1488 | 1692 | 1710 |
| (MPa) | 10.3 | 11.7 | 11.8 |
| ELONG.BK. (%) | 17 | 52 | 18 |
| MELT IND. (4) | 0.1 | 0.8 | 0.6 |
| MELT IND. (5) | 54 | 67 | 105 |

(1) MI = 0 @ 2.16 KG; 17 @ 21.6 KG (200° C.)
(2) PROFAX ® 6823 (MI = 0.2)
(3) EP 4934-8 (MI = 4)
(4) 200° C., 2160 GR.
(5) 200° C., 21.6 KG.

TABLE 3

COEXTRUDABLE ADHESIVE BLENDS
W&P TWIN SCREW (30 mm) SCALE-UP RUNS

| INGREDIENT (PTS) | 3A | 3B | 3C |
|---|---|---|---|
| HYTREL ® 4069 (1) | 60 | 60 | 60 |
| PP (2) | 30 | 30 | 30 |
| EBAGMA (3) | 10 | 20 | 30 |
| MISC. | | | |
| PROPERTIES | | | |
| TENSILE STR.YLD.(PSI) | 1110 | 1556 | 1000 |
| (MPa) | 7.6 | 10.7 | 6.9 |
| ELONG.YLD. (%) | 9 | 10 | 12 |
| TENSILE STR.BK.(PSI) | 1157 | 1520 | 1008 |
| (MPa) | 7.8 | 10.5 | 6.9 |

TABLE 3-continued

COEXTRUDABLE ADHESIVE BLENDS
W&P TWIN SCREW (30 mm) SCALE-UP RUNS

| INGREDIENT (PTS) | 3A | 3B | 3C |
|---|---|---|---|
| ELONG.BK. (%) | 25 | 77 | 68 |
| MELT IND. (4) | 0.0 | 0.0 | 0.0 |
| MELT IND. (5) | 20 | 15 | 19 |

(1) MI = 0 @ 2.16 KG; 17 @ 21.6 KG (200° C.)
(2) PROFAX ® 6823 (MI = 0.2)
(3) ELVALOY ® 4170 (MI = 8)
(4) 200° C., 2160 GR.
(5) 200° C., 21.6 KG.

TABLE 4

COEXTRUDABLE ADHESIVE BLENDS
W&P TWIN SCREW (30 mm) SCALE-UP RUNS

| INGREDIENT (PTS) | 4A | 4B | 4C | 4D |
|---|---|---|---|---|
| HYTREL ® 4069 | 42 | 42 | 42 | 42 |
| PP (1) | 38 | 44 | 50 | 56 |
| EGMA (2) | 20 | 20 | 20 | 20 |
| MISC. | | | | |
| PROPERTIES | | | | |
| TENSILE STR.YLD.(PSI) | 2118 | 2005 | 1969 | 2261 |
| (MPa) | 14.6 | 13.8 | 13.6 | 15.6 |
| ELONG.YLD. (%) | 13 | 7 | 7 | 12 |
| TENSILE STR.BK.(PSI) | 1841 | 2116 | 2312 | 1974 |
| (MPa) | 12.7 | 14.6 | 15.9 | 13.6 |
| ELONG.BK. (%) | 175 | 28 | 18 | 50 |
| MELT IND. (3) | 0.3 | 0.4 | 0.4 | 0.3 |
| MELT IND. (4) | 60.0 | 60.0 | 59.0 | 46 |

(1) PROFAX ® 6823 (MI = 0.2)
(2) EP 4934-8 (MI = 4)
(3) 200° C., 2160 GR.
(4) 200° C., 21.6 KG.

TABLE 5

COEXTRUDABLE ADHESIVE BLENDS
W&P TWIN SCREW (30 mm) SCALE-UP RUNS

| INGREDIENT (PTS) | 5A | 5B | 5C | 5D |
|---|---|---|---|---|
| HYTREL ® 4056 | 42 | 42 | 42 | 42 |
| PP (1) | 38 | 44 | 50 | 56 |
| EGMA (2) | 20 | 20 | 20 | 20 |
| MISC. | | | | |
| PROPERTIES | | | | |
| TENSILE STR.YLD.(PSI) | 2291 | 1975 | 2881 | 2878 |
| (MPa) | 15.8 | 13.6 | 19.9 | 19.8 |
| ELONG.YLD. (%) | 15 | 5 | 18 | 16 |
| TENSILE STR.BK.(PSI) | 1807 | 2282 | 2008 | 2432 |
| (MPa) | 12.5 | 15.7 | 13.8 | 16.8 |
| ELONG.BK. (%) | 148 | 25 | 352 | 276 |
| MELT IND. (3) | 3.2 | 2.8 | 2.4 | 2.2 |
| MELT IND. (4) | 169 | 179 | 190 | 159 |

(1) PROFAX ® 6823 (MI = 0.2)
(2) EP 4934-8 (MI = 4)
(3) 200° C., 2160 GR.
(4) 200° C., 21.6 KG.

TABLE 6

COEXTRUDABLE ADHESIVE BLENDS
W&P TWIN SCREW (30 mm) SCALE-UP RUNS

| INGREDIENT (PTS) | 6A | 6B | 6C | 6D |
|---|---|---|---|---|
| HYTREL ® 4069 | 42 | 42 | 42 | 42 |
| PP (1) | 38 | 44 | 50 | 56 |
| PP-g-MAH (2) | 20 | 20 | 20 | 20 |
| MISC. PROPERTIES | | | | |
| TENSILE STR.YLD. (PSI) | 1530 | 1719 | 2183 | 2838 |
| (MPa) | 10.5 | 11.8 | 15.0 | 19.6 |
| ELONG.YLD. (%) | 4 | 5 | 6 | 11 |
| TENSILE STR.BK. (PSI) | 2300 | 2388 | 2671 | 2817 |
| (MPa) | 15.8 | 16.5 | 18.4 | 19.4 |
| ELONG.BK. (%) | 10 | 12 | 24 | 123 |
| MELT IND. (3) | 0.6 | 0.6 | 0.5 | 0.4 |
| MELT IND. (4) | 173 | 161 | 140 | 103 |

(1) PROFAX ® 6823 (MI = 0.2)
(2) FUSABOND ® P 353D (MI = 280)
(3) 200° C., 2160 GR.
(4) 200° C., 21.6 KG.

TABLE 7

COEXTRUDABLE ADHESIVE BLENDS
W&P TWIN SCREW (30 mm) SCALE-UP RUNS

| INGREDIENT (PTS) | 7A | 7B | 7C | 7D |
|---|---|---|---|---|
| HYTREL ® 4069 | 42 | 42 | 42 | 42 |
| PP (1) | 42 | 42 | 42 | 42 |
| PP-g-MAH (2) | 20 | 20 | 20 | 20 |
| PP (3) | 14 | 28 | 42 | 56 |
| PROPERTIES | | | | |
| TENSILE STR.YLD. (PSI) | 2837 | 3045 | 3097 | 3190 |
| (MPa) | 19.5 | 21.0 | 21.3 | 22.0 |
| ELONG.YLD. (%) | 19 | 17 | 19 | 17 |
| TENSILE STR.BK. (PSI) | 5238 | 5021 | 3006 | 2639 |
| (MPa) | 36.1 | 34.6 | 20.7 | 18.2 |
| ELONG.BK. (%) | 857 | 772 | 547 | 468 |
| MELT IND. (4) | 0.5 | 0.5 | 0.4 | 0.4 |
| MELT IND. (5) | 133 | 158 | 95 | 76 |

(1) PROFAX ® 6823 (MI = 0.2)
(2) FUSABOND ® P 353D (MI = 280)
(3) PROFAX ® 6823 IN SECOND FEED PORT
(4) 200° C., 2160 GR.
(5) 200° C., 21.6 KG.

Melt Compounding of the Coextrudable Adhesives

All of the ingredients, including the DuPont Hytrel® copolyester elastomer (dried at 70° C. in vacuo), were pellet blended and fed to a 30 mm Werner and Pleiderer co-rotating twin-screw extruder. The extruder consisted of nine barrels totaling 870 mm, and had the screw design as defined in Table 8. The feed port was in the first barrel, and a vacuum port was in barrel 8. A two-hole die, each hole ³⁄₁₆" (1.27 cm) in diameter, was at the end of barrel 9. As the adhesive melt exited the die, the strands were quenched in a water bath, then cut into pellets. The product was dried (70° C. in vacuo) and re-extruded a second time to ensure complete reaction of the functional compatibilizers with the Hytrel®. The temperature profile on the barrels was an uphill profile from 200° C. to 250° C., resulting in a melt temperature of about 250° C. The screw rpm was 150, and the extrusion rate was 30 lb/hr (14 kg/hr).

TABLE 8

| | Extruder Screw Design | | |
|---|---|---|---|
| Bushing | Comments | | No. |
| 42/42 R | Feed | 2 | 84 |
| 42/21 R | | 1 | 105 |
| 28/28 R | | 3 | 189 |
| KB 28 N | | 2 | 245 |
| 20/10 L | | 1 | 255 |
| 42/42 R | | 2 | 339 |
| KB 28 N | | 2 | 395 |
| 20/10 L | | 1 | 405 |
| 42/42 R | | 2 | 489 |
| 28/28 R | | 1 | 517 |
| KB 14 R | | 1 | 531 |
| 14/14 R | | 1 | 545 |
| 20/10 L | | 2 | 565 |
| 42/42 R | | 4 | 733 |
| 42/21 R | | 1 | 754 |
| 20/10 L | | 1 | 764 |
| 28/28 R | | 3 | 848 |
| 20/10 R | | 1 | 858 |
| 20/20 R | | 1 | 878 |

Notation for RH and LH elements is PITCH/LENGTH

Lap Shear Testing (ASTM D3163-96)

Lap shear specimens were prepared using 3 in. long (7.62 cm), 1 in. width (2.54 cm)×⅛ in. (0.32 cm) thick substrates (i.e., polar and non-polar outer layers). The polar substrate and non-polar substrate were laid one upon the other such that they overlapped in a 1 square inch area (2.54 cm²); a 0.010 in. (0.025 cm) thick adhesive tie layer was used to join them where they overlapped. A shim was placed on the underside of the top substrate at the end opposite of the overlap.

Samples were prepared in a preheated press between two stainless steel plates using ⅛ inch (0.32 cm) shims (as mentioned above), aligned in such a manner to support the upper substrate and allow the joint/overlap area to be level during pressing. Other shims, of about 0.26 in (0.67 cm) thick were used to allow specimens to be prepared using contact pressure in the press. Press was preheated to 200° C. After a press time of 5 minutes, samples were allowed to cool to room temperature before removal from press.

Samples were removed from press, the extruded adhesive was trimmed to give a true 1 square inch (2.54 cm²) test area and were left at 23° C., 50% relative humidity overnight. Samples were then tested on an Instron using hand-tightened, non-slip clamps at a crosshead speed of 0.2 in/min (0.5 cm/min). Gauge length was approximately 1.75 inches (4.45 cm).

Table 9 summarizes the lap shear values obtained with the adhesives between polyolefins (polypropylene and polyethylene) and a wide range of polar resins. In all cases, no adhesion was observed without the adhesive tie layer.

TABLE 9

| | | CO-EX ADHESIVE LAP SHEAR VALUES (1) | | |
|---|---|---|---|---|
| EXAMPLE | POLAR POLYMER | NONPOLAR POLYMER | LAP SHEAR (PSI) | LAP SHEAR (MPa) |
| 1A | PVC (2) | POLYPROPYLENE (3) | 353 | 2.4 |
| 1B | " | " | 182 | 1.3 |
| 1C | " | " | 200 | 1.4 |
| 2A | " | " | 292 | 2.0 |
| 2B | " | " | 188 | 1.3 |
| 2C | " | " | 49 | 0.3 |
| 3A | " | " | 105 | 0.7 |
| 3B | " | " | 202 | 1.4 |
| 3C | " | " | 161 | 1.1 |
| 4A | " | " | 100 | 0.7 |
| 4B | " | " | 110 | 0.8 |
| 4C | " | " | 152 | 1.0 |
| 4D | " | " | 148 | 1.0 |
| 5A | " | " | 297 | 2.0 |
| 5B | " | " | 203 | 1.4 |
| 5C | " | " | 349 | 2.4 |
| 5D | " | " | 250 | 1.7 |
| 6A | " | " | 228 | 1.6 |
| 6B | " | " | 105 | 0.7 |
| 6C | " | " | 180 | 1.2 |
| 6D | " | " | 170 | 1.2 |
| 7A | " | " | 185 | 1.3 |
| 7B | " | " | 228 | 1.6 |
| 7C | " | " | 114 | 0.8 |
| 7D | " | " | 65 | 0.4 |
| 6C | POLYCARBONATE (4) | " | 75 | 0.5 |
| " | EVOH (5) | " | 230 | 1.6 |
| " | IONOMER (6) | " | 151 | 1.0 |
| " | PBT (7) | " | 80 | 0.6 |
| " | NYLON 6 (8) | " | 284 | 2.0 |
| " | LCP BLEND (9) | " | 104 | 0.7 |
| " | " | POLYETHYLENE (10) | 120 | 0.8 |

(1) 10 MIL (0.025 cm) ADHESIVE FILM BETWEEN TWO POLYMER BARS (125 MIL (0.32 cm) THICK, EA.), OVERLAPPED BY 1 INCH (2.54 CM) AND HEATED IN PRESS WITH 0 PRESS. FOR 5 MIN. @ 200° C. CONDITIONED @ 25° C. FOR 22 HRS. POLYMER BARS PRESSED THIS WAY WITHOUT ADHESIVE FELL APART (ZERO LAP SHEAR VALUE).
(2) GEON ® 87416
(3) PROFAX ® 6823
(4) LEXAN ® 134R
(5) SELAR ® OH 4416
(6) SURLYN ® 8140
(7) CRASTIN ® 6129
(8) CAPRON ® 8202
(9) ZENITE ® 400/HYTREL ® 4556 (85/15)
(10) SCLAIR ® 2909

Peel Strength Testing (ASTM D903-98)

Specimens were cut out of the coextruded laminates in both the machine direction and the transverse direction. The specimens had a width of 1 in. (25 mm) and a length of about 6 in. (152 mm). The thicknesses of the three layers, shown in Table 10, were measured after the PVC layer was peeled away from the substrate (polypropylene) layer. After conditioning at 50% R.H. and 23° C. for 22 hours, the specimens were mounted into the Instron Tensile Teser with the bottom grips clamped to the polypropylene substrate and the top grip clamped to the peeled-away, formerly adjacent, PVC layer.

This allows an approximate 180° angle of separation of the adhered surfaces. The peel or stripping strength is the average load, per unit width of bondline, required to separate progressively one surface from the other over the adhered area.

The separation rates of 2 inches/min (5.1 cm/min) and 10 inches/min (25.4 cm/min) were used to generate peel strength values in lbs/in (kg/mm) as shown in Table 10.

TABLE 10

PEEL ADHESION VALUES ON COEXTRUDED SHEET

|     | LAYER THICKNESSES (MILS/mm) | | | ADHESION (3) | | | |
|-----|------|------|------|------|------|------|------|
|     |      |      |      | 2"/MIN (5.1 cm/min) | | 10"/MIN. (25.4 cm/min) | |
| EX. | PP (1) | ADH. | PVC (2) | lbs/in | kg/mm | lbs/in | kg/mm |
| 4A | 71/1.8 | 8/0.20 | 9/0.23 | 2–6 | 0.04–0.11 | 3–8 | 0.05–0.14 |
| 4B | 74/1.9 | 7/0.18 | 9/0.23 | 2–6 | 0.04–0.11 | 4–6 | 0.07–0.11 |
| 4C | 77/2.0 | 6/0.15 | 7/0.18 | 4–5 | 0.07–0.09 | 4–7 | 0.07–0.13 |
| 4D | 77/2.0 | 6/0.15 | 3/0.08 | 2–3 | 0.04–0.05 | 3–5 | 0.05–0.09 |
| 6A | 73/1.9 | 6/0.15 | 3/0.08 | 1–2 | 0.03–0.04 | 3–4 | 0.05–0.07 |
| 6B | 74/1.9 | 6/0.15 | 2/0.051 | 1–6 | 0.02–0.11 | 3–7 | 0.05–0.13 |
| 6C | 74/1.9 | 7/0.18 | 2/0.051 | 4–6 | 0.07–0.11 | 5–8 | 0.09–0.14 |
| 6D | 70/1.8 | 1/0.02 | 3/0.08 | 3–5 | 0.05–0.09 | 6–9 | 0.11–0.13 |
| 7A | 74/1.9 | 8/0.20 | 4/0.10 | 3–4 | 0.05–0.07 | 6–7 | 0.11–0.13 |
| 7B | 73/1.9 | 8/0.20 | 3/0.08 | 4–7 | 0.07–0.13 | 5 | 0.09 |
| 7C | 74/1.9 | 9/0.23 | 3/0.08 | 5 | 0.09 | 6 | 0.11 |
| 7D | 71/1.8 | 9/0.23 | 3/0.08 | 3–4 | 0.05–0.07 | 4–6 | 0.07–0.11 |

(1) PROFAX ® 6823
(2) GEON ® 83974 BROWN 3830
(3) 180°, LBS./IN. (kg/mm): RANGE OF VALUES ACROSS SHEET WIDTH INCLUDING MD AND TD PULLS
1 inch (2.54 cm) sample
CONTROL WITHOUT ADHESIVE HAS NO ADHESION (FALLS APART)

Coextrusion Process

General Layout

The following explains the coextrusion process used to produce coextruded samples for the examples. Three extruders were coupled via transfer lines to a feedblock which in turn was connected to a flat film die. The coextruded film was fed to a three-roll stack consisting of a pair of nip-rolls followed by a casting roll. This, in turn, was followed by haul-off rolls consisting of two rubber nip-rolls followed by a wind-up roll for collecting final product.

Extruder A

This extruder was used to melt and feed the non-polar, polyolefin resin. It was manufactured by Killion Extruders, Inc., and has a screw 36 inches (91 cm) in length and 1.5 inches (3.81 cm) in diameter. A mixing section of 20 inches (51 cm) in length is incorporated in the screw.

Extruder B

This extruder, from the same manufacturer of Extruder A, is equipped with a screw that is 24 inches (61 cm) in length and 1 inch (2.54 cm) in diameter and is of general purpose screw design. Extruder B was used to melt and feed the coextrudable adhesives.

Extruder C

This extruder is also of the same manufacturer and was equipped with a screw that is 30 inches (76 cm) in length and 1.25 inches (3.2 cm) in diameter. This screw is also a general purpose screw and was used to melt and feed the polar, e.g., PVC resin.

Feedblock

Figure 1A:
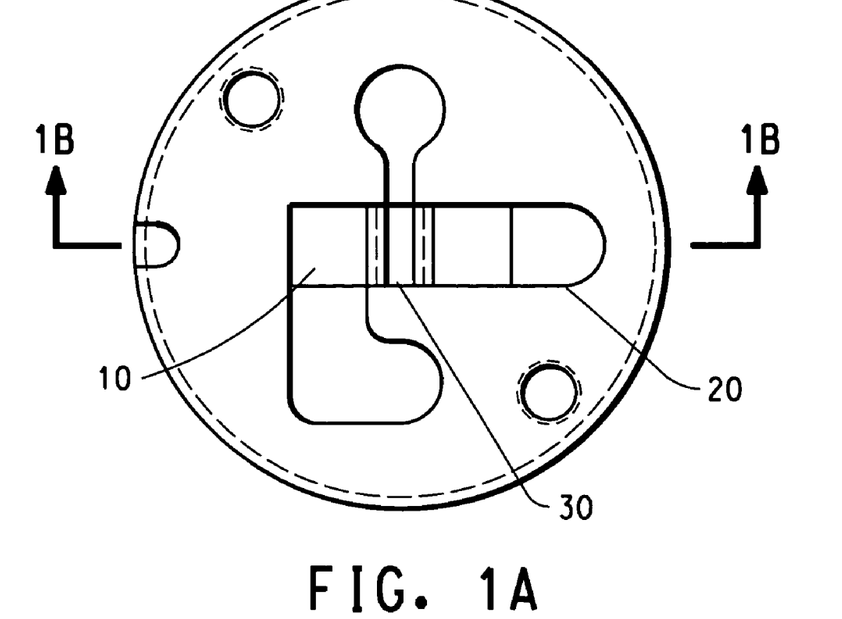
FIGS. 1A and 1B represent a schematic drawing of the coextrusion feedblock insert which allows three melt streams to converge and be coextruded.
Figure 1B:
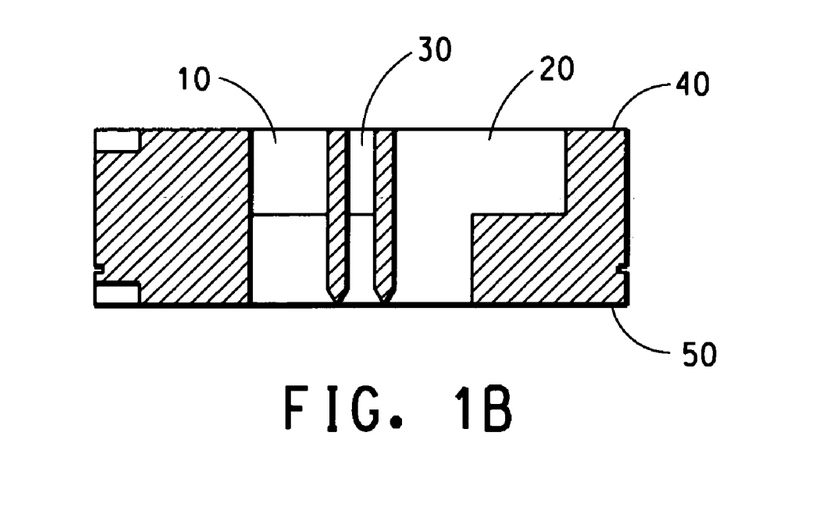

The coextrusion feedblock, into which the three melt streams converge, is equipped with an insert that brings the three melt streams together with the PVC being the top layer, the adhesive the middle layer, and the polyolefin the bottom layer. FIGS. 1A and 1B show the design of this insert.

Die

The die was manufactured by Extrusion Dies, Inc., and is of the "coat-hanger" design with adjustable lips and is 14 inches (35.6 cm) wide.

Processing Conditions

Extruder A was run at 131 rpm with barrel temperature set to generate a polypropylene melt temperature of 200 to 212° C. Extruder B was run at 30–36 rpm with barrel temperature set to generate an adhesive melt temperature of 197 to 209° C. Extruder C was run at 31 to 37 rpm with barrel temperature set to generate a PVC melt temperature of 198 to 203° C. The transfer lines were set at 195–210° C., and the die was set at 195° C. A product take-off rate of 1.7 feet per minute (52 cm/min) was used.

Product Properties

Table 10 summarizes the properties of the three-layer films that were produced from the various coextruded samples. Good adhesion was obtained in all examples relative to the control which showed no adhesion without the adhesives.

What is claimed is:

1. A multi-layer polymer composition comprising
   (1) a first outer layer,
   (2) a second outer layer and
   (3) an adhesive tie layer between the two outer layers,
wherein the first outer layer comprises a. polar polymer, the second outer layer comprises a non-polar polymer, and the adhesive tie layer comprises (a) a copolyester elastomer that is totally or partially miscible with the polar polymer of the first outer layer, (b) a non-polar polymer that is totally or partially miscible with the non-polar polymer of the second outer layer and (c) a copolymer selected from the group consisting of acid copolymers or anhydrides derived from add copolymers wherein said copolymers or anhydrides derived from acid copolymers are totally or partially miscible with the non-polar polymer of the second outer layer.

2. The multi-layer polymer composition of claim 1 wherein the adhesive tie layer comprises about 25–65% by weight component (a), up to 65% by weight component (b) and about 10–50% by weight component (c), wherein all percentages are based on the total weight of the adhesive tie layer.

3. The multi-layer polymer composition of claim 1 wherein the adhesive tie layer comprises about 25–65% component (a), about 25–65% by weight component (b) and about 10–50% by weight component (c). wherein all percentages are based on the total weight of the adhesive tie layer.

4. The multi-layer polymer composition of claim 1 wherein the first outer layer comprises a polar polymer selected from the group consisting of: polyvinylchioride homopolymer and copolymers. acrylonitrile-butadiene-styrene (ABS), polyvinylidene dichloride (PVDC), poly(ethylene terephtalate) (PET) homopolymer or copolymers, polyamides, polycarbonate, ethylene vinyl alcohol homopolymer and copolymers, acid copolymers, ionomers, liquid crystalline polymers, polyacetals, acetal copolymers, and polylactic acid.

5. The multi-layer polymer composition of claim 1 wherein the second outer layer comprises a non-polar polymer selected from the group consisting of: polypropylene homopolymer and copolymers, and polyethylene homopolymer and copolymers.

6. The multi-layer polymer composition of claim 1 wherein the copolyester elastomer comprises a segmented thermoplastic ether-ester elastomer exhibiting a shore D hardness of about 55 or less and having soft segments comprising polytetramethylene glycol (PTMEG).

7. The multi-layer polymer composition of claim 1 wherein the first outer layer comprises PVC and the second outer layer comprises polypropylene homopolymer.

8. Exterior siding for buildings comprising the multi-layer polymer composition of claim 1.

9. The exterior siding of claim 8 wherein the first outer Layer of said multi-layer polymer composition comprises PVC and said first outer layer comprises the exterior surface of the siding.

10. An article comprising the multi-layer polymer composition of claim 1 wherein the article is selected from the group consisting of: construction materials, automobile interior parts, and toys.

11. The multi-layer polymer composition of claim 1 wherein the polymer composition is made by a process selected from the group consisting of: coextrusion and lamination.

12. The multi-layer polymer composition of claim 1 wherein component (c) comprises maleic-anhydride-grafted polypropylene.

13. A multi-layer polymer composition having
   (1) a first outer layer having an interior surface and an exterior surface,
   (2) a second outer layer having an interior surface and an exterior surface and
   (3) an adhesive tie layer disposed between the two outer layers,
wherein the first outer layer comprises a polar polymer, the second outer layer comprises a non-polar polymer and the adhesive tie layer contacts the interior surface of the first outer layer and the interior surface of the second outer layer, the adhesive tie layer comprising (a) a copolyester elastomer that is totally or partially miscible with the polar polymer of the first outer layer, (b) a non-polar polymer that is totally or partially miscible with the non-polar polymer of the second outer layer and (c) a copolymer that contains functional groups capable of reaction with the functional end groups of component (a) and that is totally or partially miscible with the non-polar polymer of the second outer layer.

14. The multi-layer polymer composition of claim 13 wherein component (c) of the adhesive tie layer comprises an ethylene copolymer of the formula E/X/Y, wherein
   E is the radical formed from ethylene and comprises about 40–90 weight % of the ethylene copolymer,
   X is the radical formed from wherein $R_1$ is an alkyl group with 1–8 carbon atoms,
   $R_2$ is selected from the group consisting of H, $CH_3$ or $C_2H_5$ and X comprises about 0–40 weight percent of the ethylene copolymer and
   Y is selected from the group consisting of glycidyl methacrylate and glycidyl acrylate, and
   Y comprises 0.1–20 weight percent of the ethylene copolymer.

15. The multi-layer polymer composition of claim 13 wherein the adhesive tie layer comprises about 25–65% by weight component (a), up to 65% by weight component (b) and about 10–50% by weight component (c), wherein all percentages are based on the total weight of the adhesive tie layer.

16. The multi-layer polymer composition of claim 13 wherein the adhesive tie layer comprises about 25–65% component (a), about 25–65% by weight component (b) and about 10–50% by weight component (c), wherein all percentages are based on the total weight of the adhesive tie layer.

17. The multi-layer polymer composition of claim 13 wherein the first outer layer comprises a polar polymer selected from the group consisting of: polyvinylchloride homopolymer and copolymers, acrylonitrile-butadiene-styrene (ABS), polyvinylidene dichloride (PVDC), poly(ethylene terephthalate) (PET) homopolymer or copolymers, polyamides, polycarbonate, ethylene vinyl alcohol homopolymer and copolymers, acid copolymers, ionomers, liquid crystalline polymers, polyacetals, acetal copolymers, and polylactic acid.

18. The multi-layer polymer composition of claim 13 wherein the second outer layer comprises a non-polar polymer selected from the group consisting of: polypropylene homopolymer and copolymers, and polyethylene homopolymer and copolymers.

19. The multi-layer polymer composition of claim 13 wherein the copolyester elastomer comprises a segmented thermoplastic ether-ester elastomer exhibiting a Shore D hardness of about 55 or less and having soft segments comprising polytetramethylene glycol (PTMEG).

20. The multi-layer polymer composition of claim 13 wherein the first outer layer comprises PVC and the second outer layer comprises polypropylene homopolymer.

21. The multi-layer polymer composition of claim 13 wherein the multi-layer polymer demonstrates a peel strength as tested using ASTM D903-98 greater than about 5 lbs/in width (0.09 kg/mm width).

22. Exterior siding for buildings comprising the multi-layer polymer composition of claim 13.

23. The exterior siding of claim 22 wherein the first outer layer of said multi-layer composition comprises PVC and wherein said first outer layer comprises the exterior surface of the siding.

24. An article comprising the multi-layer polymer composition of claim 13 wherein the article is selected from the group consisting of: construction materials, automobile interior parts, and toys.

25. The multi-layer polymer composition of claim 13 wherein the polymer composition is made by a coextrusion process.

* * * * *